US011879168B2

(12) United States Patent
Yang et al.

(10) Patent No.: US 11,879,168 B2
(45) Date of Patent: Jan. 23, 2024

(54) HIGH-MODULUS, HIGH-STRENGTH, LOW ALLOY GRAY CAST IRON FOR CYLINDER LINERS AND AUTOMOTIVE APPLICATIONS

(71) Applicant: GM Global Technology Operations LLC, Detroit, MI (US)

(72) Inventors: Jianghuai Yang, Rochester Hills, MI (US); Dale A. Gerard, Bloomfield Hills, MI (US); Qigui Wang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 9 days.

(21) Appl. No.: 17/462,527

(22) Filed: Aug. 31, 2021

(65) Prior Publication Data

US 2023/0070074 A1 Mar. 9, 2023

(51) Int. Cl.

| | |
|---|---|
| ***C22C 37/10*** | (2006.01) |
| ***F02F 1/00*** | (2006.01) |
| ***C22C 37/08*** | (2006.01) |

(52) U.S. Cl.

CPC .............. *C22C 37/10* (2013.01); *C22C 37/08* (2013.01); *F02F 1/004* (2013.01)

(58) Field of Classification Search

CPC ........... C22C 37/10; C22C 37/08; F02F 1/004

See application file for complete search history.

(56) References Cited

U.S. PATENT DOCUMENTS

| | | | | |
|---|---|---|---|---|
| 9,132,478 | B2 * | 9/2015 | Muller | B22D 19/0009 |
| 2019/0093203 | A1 * | 3/2019 | Hatakeyama | C22C 37/10 |

FOREIGN PATENT DOCUMENTS

| | | | |
|---|---|---|---|
| CN | 103898399 B | * | 4/2016 |
| CN | 106521308 A | | 3/2017 |

OTHER PUBLICATIONS

Gong et al., CN103898399B. machine translation. (Year: 2016).*

* cited by examiner

*Primary Examiner* — John A Hevey

(74) *Attorney, Agent, or Firm* — Vivacqua Crane, PLLC

(57) ABSTRACT

A high elastic modulus, high ultimate tensile strength, and low alloy gray cast iron for cylinder liners. The gray cast iron includes from 2.60 wt % to 3.30 wt % Carbon (C); from 1.50 wt % to 2.30 wt % Silicon (Si); from 0.30 wt % to 0.80 wt % Manganese (Mn); from 0.15 wt % to 0.35 wt % Phosphorus (P); from 0.05 wt % to 0.11 wt % Sulphur (S); from 0.60 wt % to 1.20 wt % Copper (Cu); from 0.10 wt % to 0.30 wt % Chromium (Cr); from greater than 0.0 wt % to 0.1 wt % Nickle (Ni); from 0.15 wt % to 0.40 wt % Molybdenum (Mo); and balance wt % Iron (Fe). The total wt % of Si, Mn, P, S, Cu, Cr, Ni, and Mo is less than about 4.10 wt %. The gray cast iron has a Carbon Equivalent (CE) from 3.00 wt % to 3.90 wt % and the product of Mn %*S % is from 0.025 to 0.045.

20 Claims, 4 Drawing Sheets

HIGH-MODULUS, HIGH-STRENGTH, LOW ALLOY GRAY CAST IRON FOR CYLINDER LINERS AND AUTOMOTIVE APPLICATIONS

GOVERNMENT FUNDING

This invention was made with government support under contract "DE-EE0008877: Low-Mass and High-Efficiency Engine for Medium-Duty Truck Applications" awarded by U.S. Department of Energy. The government has certain rights in the invention.

INTRODUCTION

The present disclosure relates generally to iron alloys, and more particularly, to gray cast iron having high modulus and strength for casting automotive components, such as cylinder liners for internal combustion engines.

The main component of an internal combustion (IC) engine is the cylinder block. The cylinder block makes up the bottom-half of the IC engine and is the main supporting structure that holds the majority of engine components such as belt pulleys, water pump, and alternator. The cylinder block defines at least one cylinder bore where a piston moves in a reciprocating motion when fired with a combustible fuel.

In older engine designs, the cylinder blocks are manufactured of grey cast iron alloys, also known as gray cast iron or gray iron, for wear resistance due in part to the reciprocating piston. More modern engines utilize cast aluminum alloys for weight savings for improved fuel economy. Cast aluminum block engines typically utilize wear resistant gray cast iron cylinder liners pressed into the piston bores of the cylinder blocks. Alternatively, the gray cast iron liners may be placed in a casting mold and an aluminum alloy cast onto the exterior surface of the iron liners as the cylinder block is molded.

Thus, while known gray cast iron cylinder liners achieve their intended purpose for providing wear resistance to the bores of cylinder blocks, there is a continued need to enhance the stiffness and strength of the cylinder liners and to reduce the weight of the cylinder liners to assist in reducing the overall weight of the engine, while maintaining or improving wear resistance of the cylinder liners.

SUMMARY

According to several aspects, a high elastic modulus, high ultimate tensile strength, and low alloy gray cast iron (i.e. advanced gray cast iron) is disclosed. The gray cast iron includes from 2.60 wt % to 3.30 wt % Carbon (C); from 1.50 wt % to 2.30 wt % Silicon (Si); from 0.30 wt % to 0.80 wt % Manganese (Mn); from 0.15 wt % to 0.35 wt % Phosphorus (P); from 0.05 wt % to 0.11 wt % Sulphur (S); from 0.60 wt % to 1.20 wt % Copper (Cu); from 0.10 wt % to 0.30 wt % Chromium (Cr); from greater than 0.0 wt % to 0.1 wt % Nickle (Ni); from 0.15 wt % to 0.40 wt % Molybdenum (Mo); and balance wt % Iron (Fe). The total wt % of Si, Mn, P, S, Cu, Cr, Ni, and Mo is about 4.00 wt % to 4.20 wt %.

In an additional aspect of the present disclosure, the gray cast iron has a Carbon Equivalent (CE) from 3.00 wt % to 3.90 wt % and the product of Mn %*S % is from 0.025 to 0.045. Wherein CE=C+[⅓(Si+P)].

In an additional aspect of the present disclosure, C is about 3.00 wt %; Si is about 2.00 wt %; Mn is about 0.48 wt %; P is about 0.25 wt %; S is about 0.08 wt %; Cu is about 0.87 wt %; Cr is about 0.10 wt %; Ni is about 0.1 wt %; and Mo is about 0.22 wt %. CE is about 3.76 wt % and Mn %*S % is about 0.04.

In an additional aspect of the present disclosure, the gray cast iron has an Ultimate Tensile Strength (Mpa) to an Alloying Elements (wt %) ratio of greater than 80 Mpa/wt %. The Alloying Elements (wt %) is a total weight percent consisting of Si, Mn, P, S Cu, Cr, Ni, and Mo.

In an additional aspect of the present disclosure, the gray cast iron includes a microstructure having a eutectic cell count of from about 3500/cm$^2$ to about 4900/cm$^2$ and a plurality of graphite flakes. Greater than 50% of the plurality of graphite flakes are 40-80 microns in length. Greater than 90% of the plurality of graphite flakes are Graphite Type A flakes.

According to several aspects, a gray cast iron cylinder liner is disclosed. The gray cast iron cylinder liner includes from about 2.60 weight percent (wt %) to about 3.30 wt % Carbon (C); from about 1.50 wt % to about 2.30 wt % Silicon (Si); from about 0.30 wt % to about 0.80 wt % Manganese (Mn); from about 0.15 wt % to about 0.35 wt % Phosphorus (P); from about 0.05 wt % to about 0.11 wt % Sulphur (S); from about 0.60 wt % to about 1.20 wt % Copper (Cu); from about 0.10 wt % to about 0.30 wt % Chromium (Cr); from greater than 0.0 wt % to 0.1 wt % Nickle (Ni); from about 0.15 wt % to about 0.40 wt % Molybdenum (Mo); and balance wt % Iron (Fe). Mn %*S % is from about 0.025 to about 0.045. Carbon Equivalent (CE)=C+[⅓(Si+P)] is from about 3.00 wt % to 3.90 wt %.

In an additional aspect of the present disclosure, the gray cast iron cylinder liner has a microstructure having less than 1 wt % carbide, a eutectic cell count of from about 3500/cm$^2$ to about 4900/cm$^2$, greater than 90% Graphite Type A, and greater than 50% Size 5 graphite flakes.

In an additional aspect of the present disclosure, the gray cast iron cylinder liner includes 3.00 wt % C, about a total of 4.10 wt % of Si, Mn, P, S, Cu, Cr, Ni, and Mo, and a balance wt % of Fe.

According to several aspects, a gray iron casting alloy is disclosed. The gray iron casting alloy consists of from about 2.60 weight percent (wt %) to about 3.30 wt % Carbon (C); from about 1.50 wt % to about 2.30 wt % Silicon (Si); from about 0.30 wt % to about 0.80 wt % Manganese (Mn); from about 0.15 wt % to about 0.35 wt % Phosphorus (P); from about 0.05 wt % to about 0.11 wt % Sulphur (S); from about 0.60 wt % to about 1.20 wt % Copper (Cu); from about 0.10 wt % to about 0.30 wt % Chromium (Cr); from greater than 0.0 wt % to 0.1 wt % Nickle (Ni); from about 0.15 wt % to about 0.40 wt % Molybdenum (Mo); and balance wt % Iron (Fe).

The iron casting alloy has a Carbon Equivalent (CE) from 3.00 wt % to 3.90 wt % and a product of Mn %*S % is from 0.025 to 0.045.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
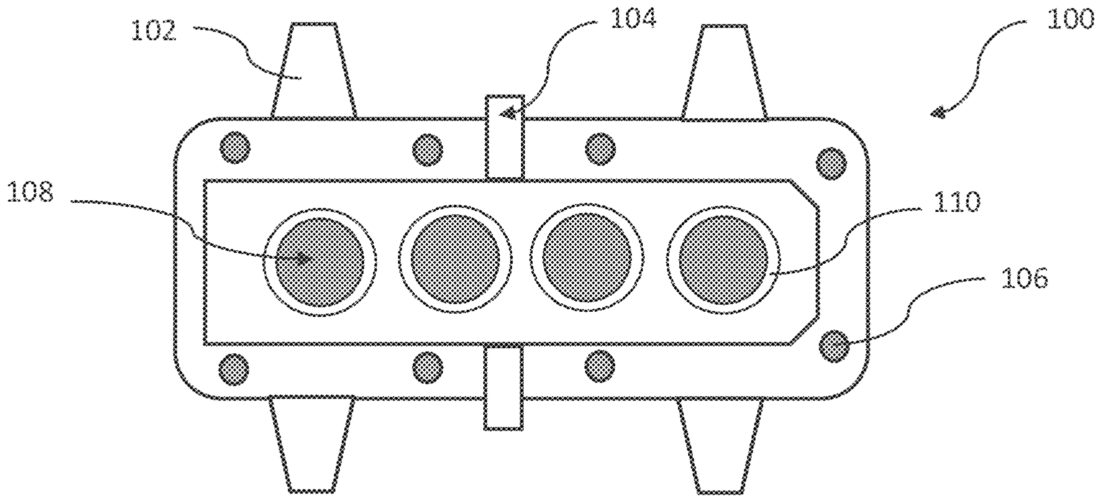
FIG. 1 is a diagrammatic plan view of a cylinder block of an internal combustion engine having a plurality of cast gray iron cylinder liners, according to an exemplary embodiment.

FIG. 1 shows a diagrammatic plan view of an exemplary lower engine block 100, also refer to as a cylinder block 100, of an internal combustion engine. The cylinder block 100 may be a single piece casting manufactured from a casting iron alloy or from a casting aluminum alloy. The cylinder block 100 defines mounting brackets 102 for attachment to a motor vehicle, accessory brackets 104 for the attachment of engine components such as alternators, water pumps, pulleys and the likes, and through-bolt bores 106 corresponding to through-bolt bores on an upper half of the engine block (not shown). The cylinder block 100 further defines a plurality of piston bores 108. A gray cast iron cylinder liner 110, also referred to as a cylinder liner 110, is disposed within each of the piston bores. The cylinder liner 110 may be pressed-in or cast-in-place to anchor the cylinder liner 110 to the surrounding cast cylinder block 108. The cylinder liner 110 is cast, preferably centrifugally cast from a high-modulus, high-strength, and low alloy gray cast iron having a composition and characteristics as disclosed below.

Figure 2:
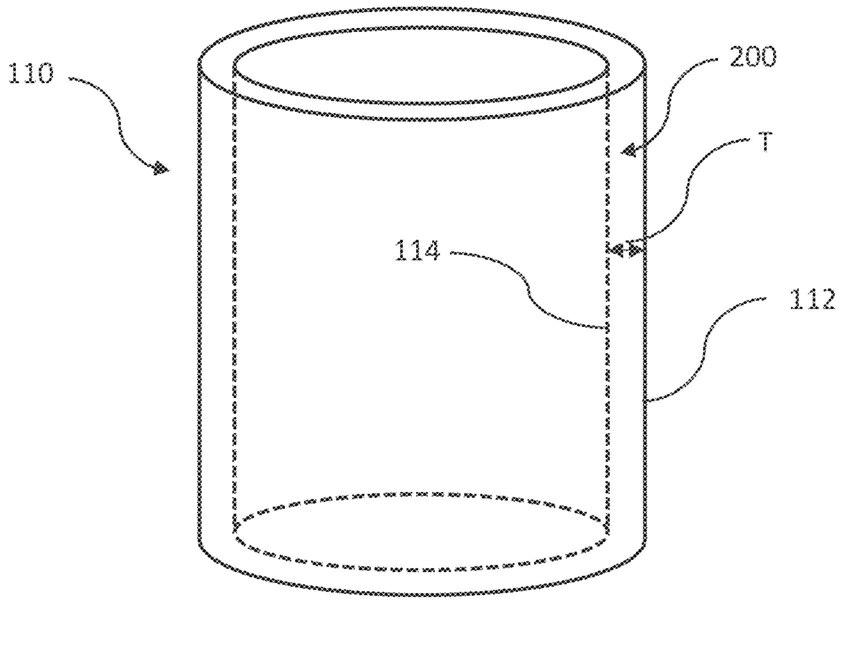
FIG. 2 is a perspective view of a cast gray iron cylinder liner of the cylinder block of FIG. 1, according to an exemplary embodiment.

FIG. 2 shows a perspective view of the cylinder liner 110. The cylinder liner 110 includes an external cylinder surface 112, an opposite facing interior cylinder surface 114, and a thickness (T) extending between the external cylinder surface 112 and the interior cylinder surface 114. The cylinder liner 110 is centrifugally cast using the high-modulus, high-strength, and low alloy gray cast iron, which is also referred to as a new gray cast iron or advanced gray cast iron for the purpose of brevity. The advanced gray cast iron includes a composition of elements in the weight percent (wt %) ranges shown in Table 1. Also, shown in Table 1 is the target wt % of each element.

TABLE 1

| Elements | Range wt % | Target wt % |
|---|---|---|
| Carbon (C) | 2.60-3.30 | 3.00 |
| Silicon (Si) | 1.50-2.30 | 2.00 |
| Manganese (Mn) | 0.30-0.80 | 0.48 |
| Phosphorus (P) | 0.15-0.35 | 0.25 |
| Sulphur (S) | 0.05-0.11 | 0.08 |
| Copper (Cu) | 0.60-1.20 | 0.87 |
| Chromium (Cr) | 0.10-0.30 | 0.10 |
| Nickle (Ni) | >0.0-0.1 max | 0.10 |
| Molybdenum (Mo) | 0.15-0.40 | 0.22 |
| Iron (Fe) | Balance | Balance |
| Total wt % of Alloying Elements Excluding C and Fe | | 4.10 |

A cylinder liner 110 manufactured with the advanced gray cast iron has a higher modulus of elasticity and a higher strength as compared to cylinder liners manufactured with traditional gray cast irons. Also, the advanced gray cast iron has a lower total wt % of alloying elements Si, Mn, P, S Cu, Cr, Ni, and Mo as compared to traditional gray cast irons. The total wt % of alloying elements Si, Mn, P, S Cu, Cr, Ni, and Mo in the advanced gray cast iron, excluding C and Fe, is between 4.00 to 4.20 wt %, preferably 4.10 wt %. The advanced gray cast iron has a Carbon Equivalent (CE) from 3.00 wt % to 3.90 wt %, preferably 3.76. CE is defined as C+[⅓(Si+P)]. The advanced gray cast iron has a Mn %*S % from 0.025 to 0.045, preferably 0.04. The empirical formula of Mn %*S % is based on study data that provides a beneficial alloying application of Manganese (Mn) to neutralize the adverse effect of sulfur (S). A range of Mn %*S % from 0.025 to 0.045, preferably 0.04, strengthens and stabilizes pearlite, reduces the total use of alloying elements (i.e. Ni, Cu, Mo) for cost saving while maximizes strengthening effect, and avoids extravagant use of manganese in strengthening gray iron. Values of Mn %*S % out of the desired range will lead the casting's strength to being off peak and less ultimate.

This unique composition provides a less expensive gray cast iron while providing a higher modulus of elasticity and higher ultimate tensile strength than traditional gray cast irons. The modulus of elasticity of the advanced gray cast iron is increased by 30% from 90-120 to 130-140 Gigapascal (GPa), the ultimate tensile strength (UTS) is increased by 10-25% to 330-380 Megapascal (MPa) compared to 300 MPa for traditional high strength gray cast irons. The total wt % of Si, Mn, P, S Cu, Cr, Ni, and Mo, not including C and Fe, ranges from about a total of 4.0 wt % to 4.2 wt %, resulting in a 30% reduction of Si, Mn, P, S Cu, Cr, Ni, and Mo required as compared to traditional high strength gray cast irons.

The ratio of [UTS/Alloying Elements wt %] is increased 20% from 70 to 90 as compared to traditional gray cast irons. "Alloying Elements wt %" is defined as the total wt % of Si, Mn, P, S Cu, Cr, Ni, and Mo. Fe and C are not included in the alloying elements wt %. Si, Mn, P, S Cu, Cr, Ni, and Mo (especially Ni, Cu, and Mo) represent the more expensive elements within the advanced gray cast iron. UTS is expressed in Mpa. For example, if UTS=350 Mpa and Alloying Elements wt %=4.1 wt %, then [UTS/Alloying Elements wt %] ratio=85.36 MPa/Alloying Elements wt %.

A summary of the mechanical characteristic of the advanced gray cast iron is shown in Table 2. It is preferable that the [UTS/Alloying Elements wt %] is greater than 80.

TABLE 2

| Mechanical Property | New Gray Cast Iron |
|---|---|
| Ultimate Tensile Strength (UTS) | 350-380 Mpa |
| Modulus of Elasticity | 137-143 Gpa |
| Hardness | 279-285 HB |
| Machinability | Good |
| UTS/Alloy Ratio | 99 |

Figure 3:
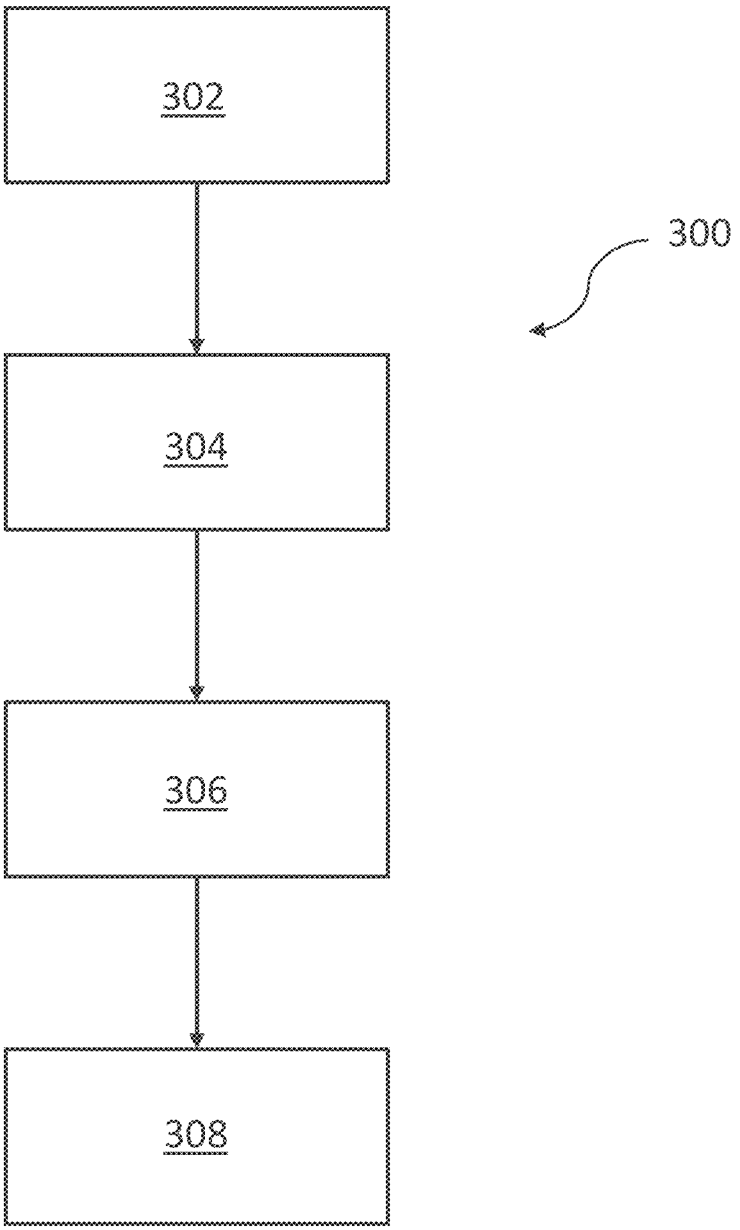
FIG. 3 is a block flow diagram for a method of making a centrifugally cast gray iron cylinder liner of FIG. 2, according to an exemplary embodiment.

Shown is FIG. 3 is a block diagram for a method of making a gray cast iron cylinder liner for a cylinder bore of an internal combustion engine (Method 300). The method 300 begins in block 302 where the advanced gray cast iron is prepared for pouring by heating the advanced gray cast iron unit it is in a molten state. The advanced gray cast iron having the desired composition may be premade into ingots beforehand and later melted into the molten state. Alternatively, the composition of the advanced alloy may be formulated by blending melted iron ingots and master iron alloys containing the desired alloying elements until the desired composition is obtained.

Moving to block 304, advanced inoculants are added to the molten advanced gray cast iron to refine primary austenite dendrite size by forming more austenitic nucleation sites. The inoculants may be that of inoculants for graphite refinement. It is preferable that the inoculant contains minor elements to form large quantities of oxides and sulfides as nucleus center, such as Calcium (Ca), Bromine (Br), Strontium (Sr), Sulfer (S), Oxygen (O), and rare earth containing inoculants, with proper addition at 0.4 wt % to 0.9 wt % of melt. The molten advanced gray cast iron is held at a molten temperature for less than the inoculate fade time, such as 10 to 12 minutes.

Moving to block 306, the molten advanced gray cast iron having inoculants are poured into a cavity of a spinning die. The pouring temperature is in the range of 1300° C. to 1450° C. to limit the growth of the graphite nuclei. The centrifugal force of the spinning die distributes the molten advanced gray cast iron across the inner wall of the spinning die forming a hollow cylinder liner 110. The spinning die operated at a rotational speed sufficient to distribute the molten advanced alloy across the inner wall of the spinning die as well as to provide sufficient agitation to break down prior formed austenite dendrites into smaller sizes. A high mold rotating speed of approximately 1200 RPM to 1600 RPM is preferred for mechanical refinement of graphite flakes. The vibration of the rotating mold breaks down already formed graphite flakes. The tumbling of the solid phase within liquid phase causing breaks down the size of the graphite, some of which becomes additional nuclei center.

Moving to block 308, a liquid coolant, such as water, is sprayed onto the die at approximately 3 to 10 seconds after pouring and continues for a duration of approximately 10 to 35 seconds to solidify the molten advanced gray cast iron.

Centrifugal is just one of many casting processes that may be used in the manufacturing of the cylinder liner. For example, the cylinder liner may be manufactured using the advanced gray cast iron by sand casting with special chills, heat sinks in the molds, to make the cooling rate as high as centrifugal casting. It is preferable that the sand-casting process is subjected to ultra-sonic vibrations to assist in the breakdown of graphite flakes.

Figure 4:
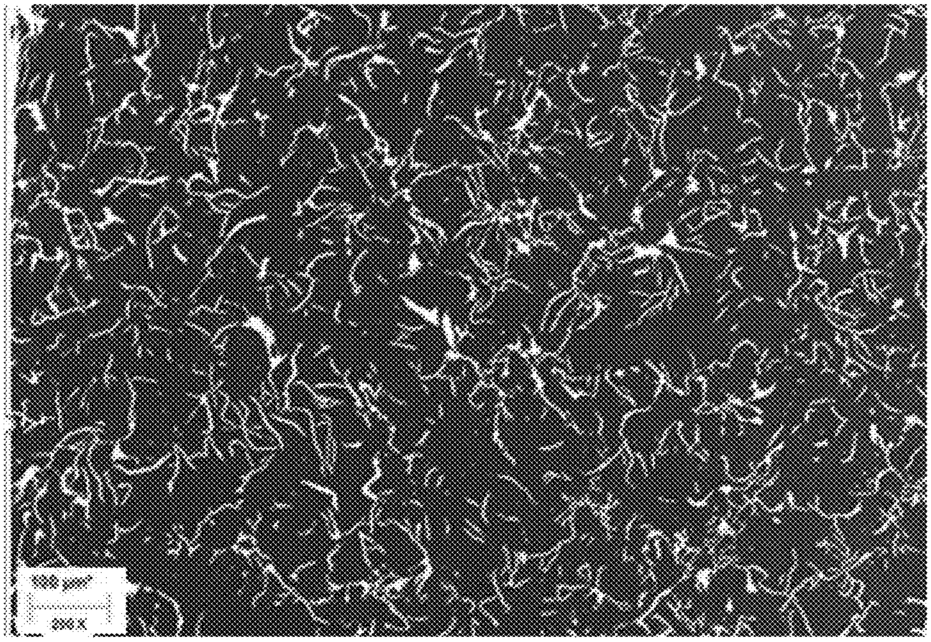
FIG. 4 is a scanning electronic microscope (SEM) image of a microstructure of a centrifugally cast gray iron tube, representing the centrifugally cast gray iron cylinder liner of FIG. 2 at 200× magnification, according to an exemplary embodiment.

Shown in FIG. 4 is a backscattered scanning electronic microscope (SEM) image of a microstructure of a centrifugally cast gray iron tube for a cylinder liner ID surface. Original magnification is 200×. The gray cast iron tube is representative of a centrifugally cast gray iron cylinder liner for a cylinder of an internal combustion engine lower bock. The dark background is a matrix of the as-polished iron specimen. The white phases are fine, uniformly sized, and distributed Type A graphite flakes, predominantly in Size #5, 40-80 microns in length per ASTM A247.

The fine Type A graphite flakes for a given alloy (hypo-eutectic composition) are formed during the solidification step where more graphite nuclei are formed with advanced inoculation, such as two-step inoculation in a holding furnace and pouring ladle and in-stream inoculation. It is preferable that the inoculant contains minor elements to form large quantities of oxides and sulfides as nucleus center, like Ca, Br, Sr, S, O, and rare earths containing inoculant, with proper addition at 0.4-0.9% of melt. The pouring temperature is lowered to the range 1300-1450° C., to provide shorter time for graphite nuclei to grow too big. The graphite flakes are mechanically refined as a result of high mold rotating speed 1200-1600 RPM.

Figure 5:
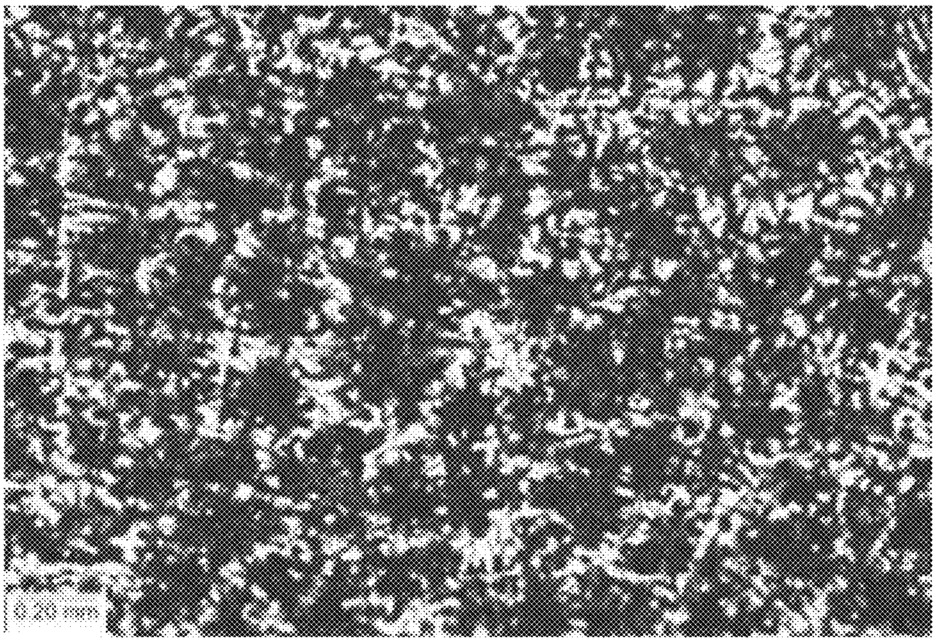
FIG. 5 is an optical microscopic image of a microstructure of the centrifugally cast gray iron tube at 50× magnification, according to an exemplary embodiment.

Shown in FIG. 5 is an optical microscopic image of a microstructure of a centrifugally cast gray iron tube cross section to display eutectic grain cells. Original magnification is 50×. This sample was annealed for other purposes. The dark areas are eutectic graphite flakes surrounded by phases formed out of last solidified liquid in roughly nodular shape. The white phases are likely ferrite as a result of the annealing effect. Annealing was done on this sample for other purposes which affected exhibition of the original eutectic cell boundaries which should have been narrower and clearer.

High eutectic cell count or small size is realized due to the advanced gray cast iron's Mn content, High Si/C ratio within CE range or higher Si, higher S content in the stated range, use of Sr and Ce containing inoculant, higher cooling rate from water spay to metal mold at 50-100° C./Sec, Lower undercool temperature (2-10° C.) in front of eutectic forming with inoculant use, and stirring (i.e. mechanically shearing) effect from mold high speed rotating during solidification at 1200-1600 RPM.

Figure 6:
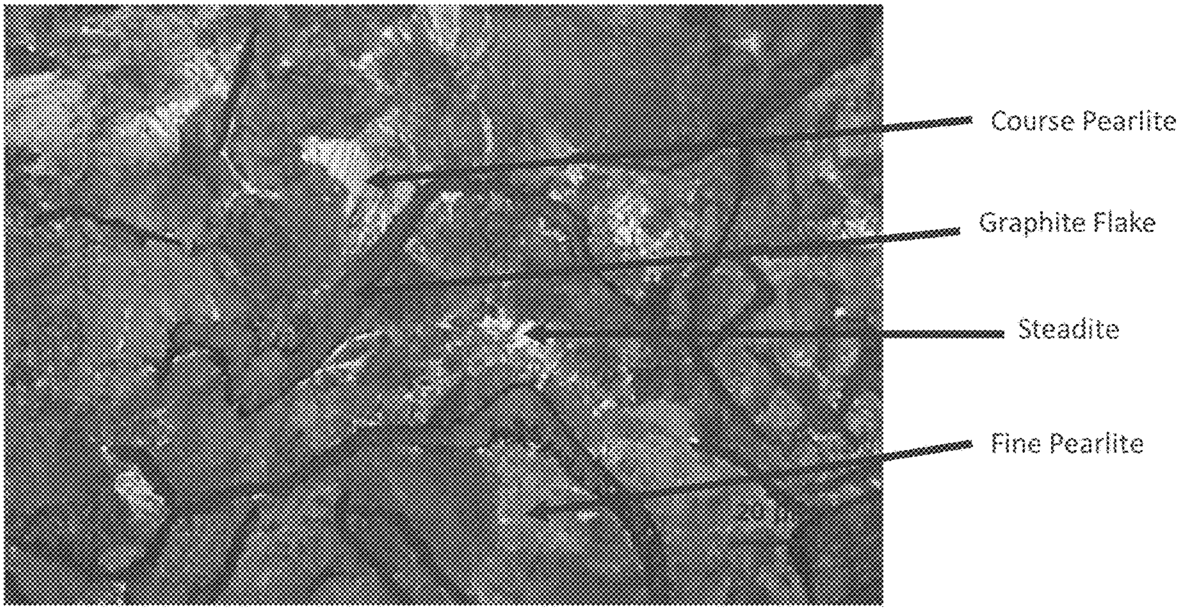
FIG. 6 is a micrograph of a microstructure of the centrifugally cast gray iron tube at 500× magnification, according to an exemplary embodiment.

Shown in FIG. 6 is a microstructure, with 3% Nital etched, of a centrifugally cast gray iron tube section at 500× magnification. The dark etched areas are fine pearlite. Fine pearlite formed at lower temperatures, 500-600° C. range, during continuous cooling of casting. Note the spacing of ferrite and cementite lamellar is small, less than 1 micron at 700-800 nano-meters. The coarse pearlite formed at higher temperature (>600° C.) during continuous cooling of casting. Note the spacing of ferrite and cementite lamellar is about 2-3 microns in the coarse pearlite structure.

Figure 7:
FIG. 7 is a micrograph of a microstructure of the centrifugally cast gray iron tube at 1000× magnification, according to an exemplary embodiment.

Shown in FIG. 7 is a microstructure, with a 3% Nital etched, of a centrifugally gray cast iron tube section at 1000× magnification. The dark etched areas are fine pearlite. Steadite is a eutectic structure of iron phosphide $FeP_3$ and ferrite. With addition of P in the alloy, formations of phosphides are inevitable. Although formations of steadite in the matrix assist in strengthening the alloy and offer wear resistance, large particles of steadite are undesirable in casting for their adverse effect on machinability and proneness to form porosity. Due to fast cooling speed and high-speed rotation of the mold during solidification in centrifugal casting, the micro-vibration of liquid inside the mold works as stirring (i.e. mechanically shearing) effect to avoid phosphide's continuous growth into detrimental networked structure. Finely dispersed steadite contributes to the alloy's strength and hardness, and also wear resistance due to its high strength and hardness.

The novel composition of the advanced alloy and casting method provides a cylinder liner having more austenite formation and fine graphite flakes as compared to traditional gray cast iron liners. A summary of the microstructure of the new gray cast ion is shown in Table 3.

TABLE 3

| Microstructure | New Gray Cast Iron |
|---|---|
| Graphite Type A | >90% |
| Flake Size | Size 5 >50% |
| Fineness of Pearlite | Fine |
| Steadite | No Network |
| Carbides | <1% |
| Eutectic Cell Count | 3500-4900/cm2 |

Numerical data have been presented herein in a range format. The term "about" as used herein is known by those skilled in the art. Alternatively, the term "about" includes +/−0.05% by weight". It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. While examples have been described in detail, those familiar with the art to which this disclosure relates will recognize various alternative designs and examples for practicing the disclosed method within the scope of the appended claims.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A gray cast iron comprising:

from about 2.60 weight percent (wt %) to about 3.30 wt % Carbon (C);

from about 1.50 wt % to about 2.30 wt % Silicon (Si);

from about 0.30 wt % to about 0.80 wt % Manganese (Mn);

from about 0.15 wt % to about 0.35 wt % Phosphorus (P);

from about 0.05 wt % to about 0.11 wt % Sulphur (S);

from about 0.60 wt % to about 1.20 wt % Copper (Cu);

from about 0.10 wt % to about 0.30 wt % Chromium (Cr);

from greater than 0.0 wt % to 0.1 wt % Nickle (Ni);

from about 0.15 wt % to about 0.40 wt % Molybdenum (Mo); and balance wt % Iron (Fe);

a Carbon Equivalent (CE) from about 3.00 wt % to 3.90 wt %, wherein CE=C+[1/3(Si+P)];

wherein Si, Mn, P, S Cu, Cr, Ni, and Mo includes a total weight percent from about 4.00 wt % to 4.20 wt %;

wherein Mn %*S % is from about 0.025 to about 0.045;

wherein the gray cast iron casting alloy is a cylinder liner obtained by centrifugal casting, comprising:

a modulus of elasticity from about 137 Gpa to about 143 Gpa; and an ultimate tensile strength from about 330 Mpa to about 380 Mpa.

2. The gray cast iron of claim 1, wherein the CE is about 3.76 wt %.

3. The gray cast iron of claim 1, wherein Mn %*S % is about 0.04.

4. The gray cast iron of claim 1, having an Ultimate Tensile Strength (Mpa) to an Alloying Elements total weight percent (total wt %) ratio of greater than 80 Mpa/total wt %, wherein the total wt % is a total weight percent of Si, Mn, P, S Cu, Cr, Ni, and Mo.

5. The gray cast iron of claim 1 having a microstructure comprising a eutectic cell count of from about 3500/$cm^2$ to about 4900/$cm^2$.

6. The gray cast iron of claim 5, wherein the microstructure comprises a plurality of graphite flakes, wherein greater than 50% of the plurality of graphite flakes are 40-80 microns in length.

7. The gray cast iron of claim 6, wherein greater than 90% of the plurality of graphite flakes are Graphite Type A flakes.

8. A gray cast iron cylinder liner comprising:

from about 2.60 weight percent (wt %) to about 3.30 wt % Carbon (C);

from about 1.50 wt % to about 2.30 wt % Silicon (Si);

from about 0.30 wt % to about 0.80 wt % Manganese (Mn);

from about 0.15 wt % to about 0.35 wt % Phosphorus (P);

from about 0.05 wt % to about 0.11 wt % Sulphur (S);

from about 0.60 wt % to about 1.20 wt % Copper (Cu);

from about 0.10 wt % to about 0.30 wt % Chromium (Cr);

from greater than 0.0 wt % to 0.1 wt % Nickle (Ni);

from about 0.15 wt % to about 0.40 wt % Molybdenum (Mo); and balance wt % Iron (Fe); and wherein Mn %*S % is from about 0.025 to about 0.045, and Carbon Equivalent (CE)=C+[1/3(Si+P)] is from about 3.00 wt % to 3.90 wt %;

wherein the gray cast iron cylinder liner is a centrifugally cast cylinder liner, comprising:

a modulus of elasticity from about 137 GPa to about 143 GPa; and an ultimate tensile strength from about 330 MPa to about 380 MPa.

9. The gray cast iron cylinder liner of claim 8, wherein:

C is about 3.00 wt %;

Si is about 2.00 wt %;

Mn is about 0.48 wt %;

P is about 0.25 wt %;

S is about 0.08 wt %;

Cu is about 0.87 wt %;

Cr is about 0.10 wt %;

Ni is about 0.1 wt %;

Mo is about 0.22 wt %;

CE is about 3.76 wt %; and

Mn %*S % is about 0.04.

10. The gray cast iron cylinder liner of claim 8, wherein Si, Mn, P, S Cu, Cr, Ni, and Mo includes a total weight percent from about 4.00 wt % to 4.20 wt %.

11. The gray cast iron cylinder liner of claim 8, further comprises less than 1 wt % carbide.

12. The gray cast iron cylinder liner of claim 8, further includes a microstructure comprising a eutectic cell count of from about 3500/$cm^2$ to about 4900/$cm^2$.

13. The gray cast iron cylinder liner of claim 12, wherein the microstructure comprises greater than 90% Graphite Type A and greater than 50% Size 5 Graphite flakes.

14. A gray iron casting alloy comprising:

from about 2.60 weight percent (wt %) to about 3.30 wt % Carbon (C);

from about 1.50 wt % to about 2.30 wt % Silicon (Si);

from about 0.30 wt % to about 0.80 wt % Manganese (Mn);

from about 0.15 wt % to about 0.35 wt % Phosphorus (P);

from about 0.05 wt % to about 0.11 wt % Sulphur (S);
from about 0.60 wt % to about 1.20 wt % Copper (Cu);
from about 0.10 wt % to about 0.30 wt % Chromium (Cr);
from greater than 0.0 wt % to about 0.1 wt % Nickle (Ni);
from about 0.15 wt % to about 0.40 wt % Molybdenum (Mo); and
balance Iron (Fe); and
wherein Mn %*S % is from about 0.025 to about 0.045;
wherein the gray iron casting alloy is a centrifugal cast cylinder liner comprising a microstructure comprising a plurality of graphite flakes, wherein greater than 50% of the plurality of graphite flakes are 40-80 microns in length.

15. The gray iron casting alloy of claim 14, wherein Si, Mn, P, S Cu, Cr, Ni, and Mo includes a total weight percent from about 4.00 wt % to 4.20 wt %.

16. The gray iron casting alloy of claim 15, wherein:
C is about 3.00 wt %;
Si is about 2.00 wt %;
Mn is about 0.48 wt %;
P is about 0.25 wt %;
S is about 0.08 wt %;
Cu is about 0.87 wt %;
Cr is about 0.10 wt %;
Ni is about 0.1 wt %; and
Mo is about 0.22 wt %.

17. The gray iron casting alloy of claim 16, wherein Mn %*S % is about 0.04.

18. The gray iron casting alloy of claim 14, further comprising a Carbon Equivalent (CE) from about 3.00 wt % to 3.90 wt %, wherein CE=C+[1/3(Si+P)].

19. The gray iron casting alloy of claim 18, wherein the CE is about 3.76 wt %.

20. The gray iron casting alloy of claim 14, wherein the centrifugal cast cylinder liner includes:
a modulus of elasticity from about 137 Gpa to about 143 Gpa; and
an ultimate tensile strength from about 330 Mpa to about 380 Mpa.

* * * * *